United States Patent [19]
Kudlaty

[11] 3,729,019
[45] Apr. 24, 1973

[54] BI-DIRECTIONAL CHECK VALVE
[75] Inventor: Walter J. Kudlaty, Elmhurst, Ill.
[73] Assignee: Marvel Engineering Company, Chicago, Ill.
[22] Filed: Mar. 10, 1971
[21] Appl. No.: 122,937

[52] U.S. Cl. ............................................. 137/493.6
[51] Int. Cl. ............................................. F16k 17/26
[58] Field of Search ............ 137/493, 493.1, 493.6, 137/493.9; 285/177, 192

[56] References Cited

UNITED STATES PATENTS

| | | | |
|---|---|---|---|
| 1,933,454 | 10/1933 | Sidney | 137/493.6 X |
| 2,171,168 | 8/1939 | Swank | 137/493.6 X |
| 2,470,800 | 5/1949 | Ashton | 285/192 |
| 3,439,873 | 4/1969 | Relf | 137/493.9 X |
| 3,493,270 | 2/1970 | Doerfler | 137/493.9 X |
| 2,016,278 | 10/1935 | Ehlers | 137/493.6 |

*Primary Examiner*—Henry T. Klinksiek
*Attorney*—Parker, Plyer & McEachran

[57] ABSTRACT

A connector joins a filter to a reservoir, the connector containing vacuum and pressure release elements entirely therewithin, the release elements including chatter-preventing configurations.

3 Claims, 3 Drawing Figures

Patented April 24, 1973
3,729,019
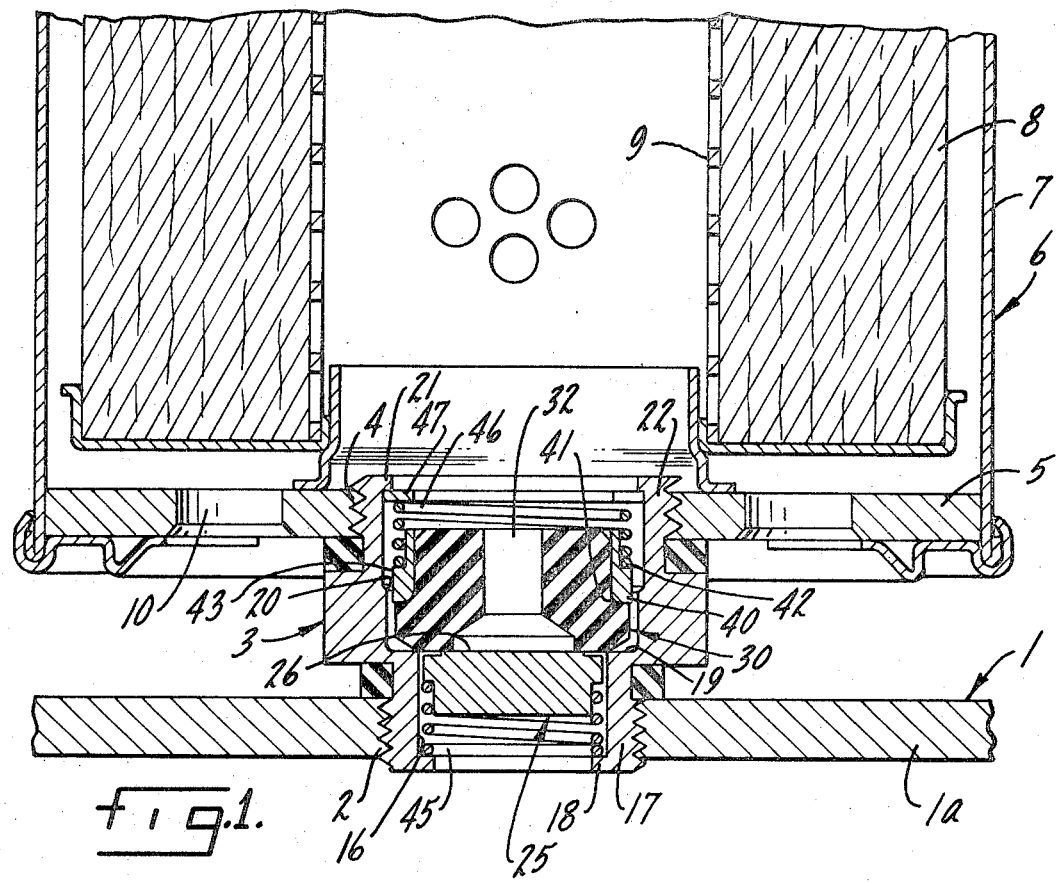
fig.1.
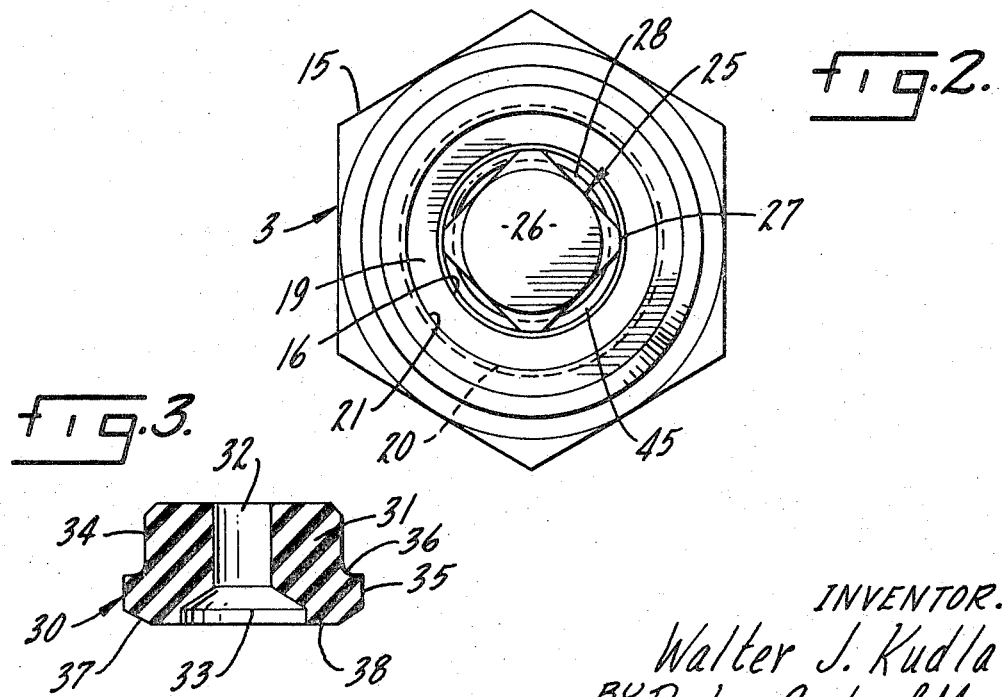
fig.2.
fig.3.
INVENTOR.
Walter J. Kudlaty
BY Parker, Carter & Markey
Attorneys.

BI-DIRECTIONAL CHECK VALVE

SUMMARY OF THE INVENTION

This invention relates to fluid pressure containers, such as air pressure reservoirs and the like and has as one of its purposes the provision of an air breather-filter assembly including a connector having vacuum and pressure relief elements entirely contained therewithin.

Another purpose is to provide an air breather assembly having vacuum and pressure relief check valves working against each other.

Another purpose is to provide an air breather assembly having means effective to substantially eliminate chatter in a check valve operation.

Another purpose is to provide an air breather assembly having a connector incapable of improper installation.

Another purpose is to provide an air breather filter assembly wherein a filter cartridge can be removed and replaced without disturbing the breather assembly.

Another purpose is to provide an air breather filter assembly wherein the air breather is fully operative in the presence or absence of the filter.

Another purpose is to provide an air breather for reservoirs and the like and effective to seal a reservoir.

Another purpose is to provide an air breather-filter assembly of maximum simplicity and economy in manufacture and use.

Other purposes may appear from time to time during the course of the specification and claims.

BRIEF DESCRIPTION OF THE DISCLOSURE

The invention is illustrated more or less diagrammatically in the accompanying drawings wherein:

FIG. 1 is a side view in cross section;

FIG. 2 is a top plan view with parts omitted; and

FIG. 3 is a detail view in cross section.

Like parts are indicated by like numerals throughout the specification and drawings.

DESCRIPTION OF THE PREFERRED EMBODIMENT

Referring now to the drawings, the numeral 1a indicates the wall of an air reservoir 1 (shown in part). A threaded opening 2 is formed in the wall 1. The breather-connector fitting 3 has one of its ends threadably received in the opening 2 and its opposite end threadably secured within a threaded opening 4 in the end wall 5 of a filter cartridge 6. Appropriate seals are provided, as shown, between fitting 3 and cartridge 6 and between fitting 3 and wall 1a.

The cartridge 6, of substantially standard construction, includes a housing 7 and a filter cylinder 8 surrounding a core 9. The atmosphere is communicated with core 9 through openings 10 in the wall 5 and through the porous filtering cylinder 8, core 9 communicating with opening 4.

It will be observed that the threads at opposite ends of the connector 3 differ. Where the threaded reservoir opening 2 and the opening 4 in cartridge wall 5 are of the same diameter the connector portion designed for reception in the reservoir wall may be provided with undersized straight pipe threads and the end designed for reception in cartridge wall 5 may be provided with UN–2A threads. As shown, the diameters of the opposite threaded end portions of connector 3 may be varied. In either case the assembler is precluded from installing the connector 3 in reverse of the position desired.

The connector 3 includes the main central body portion 15 of noncircular, preferably hexagonal, configuration, easily engageable by an appropriate hand tool. A bore 16 extends through the connector 3. Externally threaded end portion 17 has an inwardly extending annular flange 18 adjacent its end surface. The bore 16 is widened, intermediate its ends, to create the annular shelf or valve seat 19. The bore 16 is again widened in an outwardly, upwardly, conical manner to create the flared wall or expanded chamber configuration 20 beyond seat 19 from flange 18. A second inwardly extending annular flange 21 is positioned adjacent the end surface of externally threaded connector end portion 22.

Indicated at 25 is a vacuum relief check valve member preferably formed of a suitable metal, such as aluminum or the like. Member 25 has a circular upper seat surface and a plurality of circumferentially spaced shoulders 27 extending radially from its main body portion. It will be observed that the shoulders 27 create a plurality of circumferentially spaced air passages 28 about the valve 25 within the portion of bore 16 positioned in connector end portion 17.

A pressure relief check valve 30 is formed of homogenous rubberlike material, such as Buna-N or the like, and includes a circumferential body portion 31 centrally bored to form passage 32, the passage 32 being outwardly flared or expanded first in conical and then in circumferential configuration at its lower end, as the parts are shown and as indicated at 33.

Externally the valve member 30 has a major circumferential outer wall surface 34. Intermediate the ends of valve member 30 the wall 34 is offset or outwardly expanded in the form of the annular flange 35, defining with the wall 34 a slightly curved seat 36. From the flange 35, the external surface of member 30 is inwardly conically configured at its lower end, as the parts are shown and as indicated at 37. The conical wall surface 37 forms a valve face and joins a flat annular end surface 38 surrounding the larger bore end 33.

A spring sleeve 40 has a rounded end surface, as indicated at 41, formed and adapted for seating on the seat 36 of member 30, the remaining portion of sleeve 40 surrounding the wall 34 of member 30. The circumferential outer surface 43 of sleeve 40 is outwardly offset or expanded to form the annular spring seat 42.

A first spring 45 has one of its ends engaging the inner surface of flange 18 and its opposite end engaging the shoulders 27 of member 25 to urge the valve face 26 of member 25 upwardly, as the parts are shown, against the surface 38 of member 30 and to close passage 32. A second spring 46 has one of its ends seated in or engaging the seat 42 of sleeve 40 and its opposite end retained by retaining or split ring 47 snapped into place beneath, as the parts are shown, the flange 21 of connector 3 to urge valve member 30 downwardly, as the parts are shown, and to urge surface 37 of member 30 into closed position against the shoulder 19 of connector 3.

The use and operation of the invention are as follows:

As illustrated in FIG. 1, spring 46 urges valve member 30 into contact with the shoulder seat 19 and member 25 to seal the reservoir 1 against escape of fluid pressure therefrom below a given level determined by the known force of spring 46, the spring 45 holding valve 25 in position. Should the pressure within reservoir 1 rise above a desired level, said pressure, flowing through passages 28, will move valve member 30 against the action of spring 46. It will be observed that the circumference 43 of member 40 is dimensioned for minimal clearance with the opposed, circumferential wall of bore or chamber 16, a maximum diametrial clearance of 0.015 inch being a preferred tolerance limit. Thus a braking effect is provided when the valve 30 first opens. It will be understood that spring 45 maintains member 25 in closing contact with member 30 and passage 32 to preclude passage of fluid therethrough. When the valve 30 has moved a predetermined distance of limited extent off its seat 19, a rapidly increasing circumferential passage or escape area is provided by the enlargement of chamber bore 16 indicated at 20. The undesirable chatter long experienced with poppet valves of the type herein disclosed is thus eliminated. While the unbalanced pressures tending to produce such chatter immediately upon opening of the valve remain present, the configuration disclosed herein, resulting in an initial braking effect and thereafter rapid expansion of pressure escape area, produces a poppet valve operation substantially devoid of chatter and without regard to or need for particular, minutely controlled spring settings.

Should the pressure in reservoir 1 fall a predetermined level below atmosphere, the valve 25 will be drawn inwardly against the action of spring 45, the force of which is predetermined, separating the valve surface 26 from the surface 38 of member 30 and opening a passage from atmosphere through holes 10, cylinder 8, core 9 and passage 32,33 in member 30 to break the vacuum. In such event, the member 30 will remain in the position shown, the spring 46 holding member 30 against shoulder 19. When the pressure in reservoir 1 is thereafter replenished to the desired predetermined level, the predetermined force of spring 45 will return the valve 25 to the closed position shown in FIG. 1.

It will be readily observed that the cartridge 6 may simply be removed from connector 3, manual rotation of cartridge 6 being fully effective for such purposes, and a new cartridge be similarly secured to connector 3. The valves 30,25 and their accompanying springs remain undisturbed and the reservoir remains protected throughout such removal and replacement of the filter cartridge of the assembly. Should the pressures within the reservoir 1 rise above or fall below the desired predetermined range while the filter cartridge is absent from the connector 3, the operation of the breather assembly remains exactly the same and as above described.

Thus a connector 3 provides means for attaching a filter to a reservoir and, at the same time, provides an independent breather assembly entirely and automatically responsive to predetermined pressure differentials between the pressure within the reservoir 1 and that externally thereof. When the reservoir is in a nonoperating or "idle" condition, the breather structure of the invention is effective to completely seal the same.

The embodiments of the invention in which an exclusive property or privilege is claimed are defined as follows:

1. An air breather assembly for reservoirs and the like, said assembly including a body having an end portion configured for connection in the wall of a reservoir, an axial bore through said body, said bore having an outwardly offset circumferential portion defining a valve seat, a pressure relief valve member yieldingly urged toward said end portion and against said seat, a passage through said pressure relief valve member, said pressure relief valve member having a circumferential portion closely approaching the diameter of said bore to limit the passage of fluid about said pressure relief valve member when said pressure relief valve member is off said seat, said bore including a second outwardly offset circumferential portion spaced from said seat in the direction of movement of said pressure relief valve member away from said seat to provide an expanded fluid pressure passage about said pressure relief valve member when said pressure relief valve member is moved a predetermined distance in its excursion away from said seat, and a vacuum relief valve member yieldingly urged against said pressure relief valve member to close said passage, said vacuum relief member being movable with said pressure relief valve member when said pressure relief valve member is moved off said seat, said vacuum relief member having a plurality of circumferentially spaced air passages providing access to the area of said pressure relief valve member inside of said seat.

2. The structure of claim 1 further characterized in that said air breather assembly body has a first threaded end portion for connection with a threaded opening in a reservoir and a second threaded end portion for connection with a threaded opening in a filter cartridge, said threaded portions of said body being differently dimensioned to preclude connection of said second end portion with said reservoir opening.

3. The structure of claim 1 further characterized in that said circumferentially spaced air passages about said vacuum relief check valve member are formed by circumferentially spaced shoulders positioned about the exterior of said member.

* * * * *